United States Patent
Roth et al.

(10) Patent No.: US 10,315,765 B2
(45) Date of Patent: Jun. 11, 2019

(54) SERVICE BOX FOR STORING IN A STORAGE RACK ARRANGEMENT OF A CARGO CONTAINER

(71) Applicant: Airbus Operations GmbH, Hamburg (DE)

(72) Inventors: Ingo Roth, Hamburg (DE); Andreas Köhler, Hamburg (DE); Sassa Nadine Boos, Schenefeld (DE); Arne Stoldt, Hamburg (DE); Sascha-Jay Salvador, Hamburg (DE); Engin Özkan, Hamburg (DE); Lasse Jensen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 777 days.

(21) Appl. No.: 14/965,440

(22) Filed: Dec. 10, 2015

(65) Prior Publication Data
US 2016/0167785 A1 Jun. 16, 2016

(30) Foreign Application Priority Data
Dec. 15, 2014 (EP) ..................................... 14197963

(51) Int. Cl.
*B64D 11/04* (2006.01)
*B64D 11/00* (2006.01)
(Continued)

(52) U.S. Cl.
CPC .......... *B64D 11/0007* (2013.01); *B64D 11/04* (2013.01); *B65D 85/68* (2013.01); *B64D 2013/0629* (2013.01)

(58) Field of Classification Search
CPC ................ B64D 11/0007; B64D 11/04; B64D 2013/0629; B65D 85/68
(Continued)

(56) References Cited

U.S. PATENT DOCUMENTS 3,010,760 A * 11/1961 Trautmann ............... B60J 5/101
296/37.16
4,285,391 A * 8/1981 Bourner ................ F25D 31/005
165/61
(Continued)

FOREIGN PATENT DOCUMENTS

DE 38 12 739 C1 7/1989
DE 199 52 523 A1 5/2001
(Continued)

OTHER PUBLICATIONS

Extended European Search Report for Application No. 14 19 7967.4 dated Jun. 10, 2015.

*Primary Examiner* — Ernesto A Grano
(74) *Attorney, Agent, or Firm* — Jenkins, Wilson, Taylor & Hunt P.A.

(57) ABSTRACT

A service box for storing in a storage rack arrangement of a cargo container of a vehicle, in particular an aircraft, including a rectangular bottom wall, a rectangular upper wall, side walls and narrow end walls and forms an interior space adapted to receive a trolley for catering goods. The service box is provided with a door at at least one of its narrow ends, the door forming at least the main part of the narrow wall and in the open state permits insertion and removal of the trolley and in the closed state provides for an essentially closed space for the trolley.

13 Claims, 12 Drawing Sheets

(51) Int. Cl.
  *B65D 85/68* (2006.01)
  *B64D 13/06* (2006.01)
(58) Field of Classification Search
  USPC .......................................................... 206/335
  See application file for complete search history.

(56) References Cited

U.S. PATENT DOCUMENTS

| | | | |
|---|---|---|---|
| 4,323,110 A * | 4/1982 | Rubbright | F25D 23/12 |
| | | | 165/201 |
| 4,969,509 A | 11/1990 | Merensky | |
| 5,285,051 A * | 2/1994 | DeGrow | A23L 3/365 |
| | | | 165/919 |
| 5,771,959 A * | 6/1998 | Westbrooks, Jr. | A23L 3/365 |
| | | | 165/11.1 |
| 6,572,207 B2 * | 6/2003 | Hase | A47B 31/02 |
| | | | 165/919 |
| 6,820,920 B2 * | 11/2004 | Maeda | B60J 5/103 |
| | | | 296/146.12 |
| 7,036,863 B2 * | 5/2006 | Hunter | B60P 1/435 |
| | | | 296/57.1 |
| 8,967,040 B2 | 3/2015 | Fritz et al. | |
| 9,033,278 B2 * | 5/2015 | Van Loon | A47B 31/00 |
| | | | 186/45 |
| 9,045,229 B2 * | 6/2015 | Roering | B64D 11/0007 |
| 9,840,125 B2 * | 12/2017 | Burd | B60H 1/00014 |
| 9,862,496 B2 * | 1/2018 | Burd | B64D 11/04 |
| 2007/0164540 A1 * | 7/2007 | Van Dijk | B62B 3/02 |
| | | | 280/651 |
| 2008/0001031 A1 * | 1/2008 | Doebertin | B64D 11/04 |
| | | | 244/118.1 |
| 2009/0243240 A1 * | 10/2009 | Boustred | B62B 1/14 |
| | | | 280/47.19 |

FOREIGN PATENT DOCUMENTS

| | | |
|---|---|---|
| DE | 10 2010 035372 A1 | 3/2012 |
| EP | 1 683 449 A1 | 7/2006 |
| EP | 2815972 | 12/2014 |
| EP | 2815976 | 12/2014 |

* cited by examiner

SERVICE BOX FOR STORING IN A STORAGE RACK ARRANGEMENT OF A CARGO CONTAINER

CROSS-REFERENCE TO RELATED APPLICATION

This application claims priority to European Patent Application No. 14197963.3 filed Dec. 15, 2014, the entire disclosure of which is incorporated by reference herein.

TECHNICAL FIELD

The disclosure herein relates to a service box for storing in a storage rack arrangement of a cargo container of a vehicle, in particular an aircraft.

BACKGROUND

As described in earlier applications (EP 13172368.6, EP 13172370.2), service boxes, e.g. trolleys for catering goods, can be stored in a storage rack arrangement of a cargo container provided in a cargo compartment of an aircraft. These service boxes are removed from such storage rack arrangement and are moved to the passenger compartment by a transport arrangement so that the individual service boxes become available in a galley when the catering goods are required without the necessity to have all service boxes or trolleys stored in the galley or the like.

SUMMARY

To further improve such a system of storing service boxes and moving them to the place where they are required at the time they are needed, according to the disclosure herein a service box is provided which comprises a rectangular bottom wall, a rectangular upper wall, side walls and narrow end walls as well as an interior space adapted to receive a trolley for catering goods wherein at least one of the narrow end walls comprises a door which door forms at least the main part of the narrow wall and in the open state permits insertion and removal of the trolley and in the closed state provides for an essentially closed space for the trolley.

Thus, each trolley comprising catering goods is stored in such a service box so that transportation of the individual trolley is facilitated and becomes less critical when moving it to the cargo container and into its storage rack arrangement and when moving the trolley contained in the service box from the cargo container to the galley. Any spillage of liquids or food during transportation will not soil the overall transportation system but will be contained within the service box.

It should be noted that essentially closed space means a space which encloses the trolley so that it is protected against contact with the outside and against damage by insertion of elements.

Handling of the service boxes and removal the trolleys from and insertion into the service boxes is facilitated when doors are provided at both narrow ends since then the service boxes need not to be inserted into the storage rack arrangement in a predetermined orientation and trolleys can be removed from either end.

Preferably, in at least one of the narrow walls an opening for insertion of a duct for guiding a cooling medium, preferably air, into the interior space of the service box is provided. Thereby, cooling of the catering goods in the trolley can be effected without having to cool the entire storage rack arrangement including its contents.

In a preferred arrangement the opening is provided in the upper portion of the wall, and in the lower portion an exit opening is provided so that used cooling medium can exit the service box through the exit opening.

For obtaining a flexible arrangement with respect to cooling of the interior space of the service box both narrow walls may comprise an arrangement of upper and lower openings. Thus connection with a cooling duct and connection of a duct with the exit opening can be effected at either end of the service box.

The openings may be closed by a pivotable flap arrangement which can be opened by inserting ducts for guiding a cooling medium into the service box and for removing used cooling medium.

Such an arrangement allows for the automatic connection of a service box with a cooling air supply when the service box is inserted in the storage rack arrangement. Then, the cooling ducts provided on the storage rack arrangement will engage with the flap arrangement to open it and extend into the service box when the service box is moved into the rack arrangement.

In this regard, it should be noted that in a further aspect of the present disclosure which is independent of the service boxes, a storage rack arrangement having a plurality of receiving spaces for service boxes is provided wherein the receiving spaces are designed such that a service box can be inserted therein in a direction extending from the front end to the rear end of the service box. Further, each receiving space is provided with at least one cooling duct extending into the receiving space for protruding into openings in a service box. The storage rack arrangement may comprise a duct assembly which is configured such that the ducts extending into the receiving spaces are connected with a common supply connector so that each duct can be supplied with cooling medium via this supply connector. In addition, the duct assembly may comprise a common discharge connector so that the ducts in the receiving spaces which ducts may connect with exit openings in the service boxes, are connected with the discharge connector to allow for the removal of the cooling medium via a single connection. In addition, a container may comprise one or more of such storage rack arrangements.

The flap arrangement mentioned above may comprise two flap elements, each element mounted by spring elastic straps which bias the element in a closed position.

At the end of the service box comprising a door a pivotable ramp element may be provided at the bottom end to bridge the gap between the service box and the floor of the passenger cabin which ramp element is spring biased to its bridging position. The ramp element in its lifted state may form the narrow wall together with the door.

To effect lifting of the ramp element when bridging of the gap is not required a linkage coupled with the ramp element may comprise an actuator element which in the bridging state of the ramp element projects forwardly beyond the front end of the service box and upon closing of the door is displaced by the door so that the ramp element is lifted.

In another arrangement for lifting the ramp element a push bar may be provided which is coupled with the ramp element, e.g. by a wire arrangement, and effects lifting of the ramp element upon displacement due to engagement with the inserted trolley. To effect lifting of the ramp element when no trolley is to be inserted a manually actuable linkage may be provided.

On the lateral rims of the ramp element at the end connected with the bottom wall of the service box lateral side covers may be provided which form a barrier against accidental insertion of debris from the floor of the passenger cabin.

To facilitate insertion of the service box into the storage rack arrangement of the cargo container, a guide may be provided on the service box. The guide or guides may be formed by guide blocks each comprising a groove for engagement with a guide rail provided in the storage rack arrangement.

Preferably, two groups of guide blocks are located at the bottom surface laterally offset from the middle plane which extends perpendicularly with respect to the closed front door, whereas at least one guide block may be provided on the upper surface and located in the middle plane.

BRIEF DESCRIPTION OF THE DRAWINGS

In the following the disclosure herein will be described in more detail with reference to the enclosed drawings showing schematically embodiments of the disclosure herein.

DETAILED DESCRIPTION

The container 1, shown in FIG. 1, may be an LD3 container which comprises two storage rack arrangements 2, 3, each comprising a plurality of receiving spaces for containing service boxes 10 to be described in the following.

When stored in the cargo compartment of an aircraft, a unit (not shown) comprising a conveyor system corresponding to the one described in the above-referenced European patent applications will be coupled with the container, and the conveyor system can move individual service boxes out of the storage rack arrangement and along the free area formed between the storage rack arrangements and can then lift such service boxes to the passenger compartment.

Figure 7:
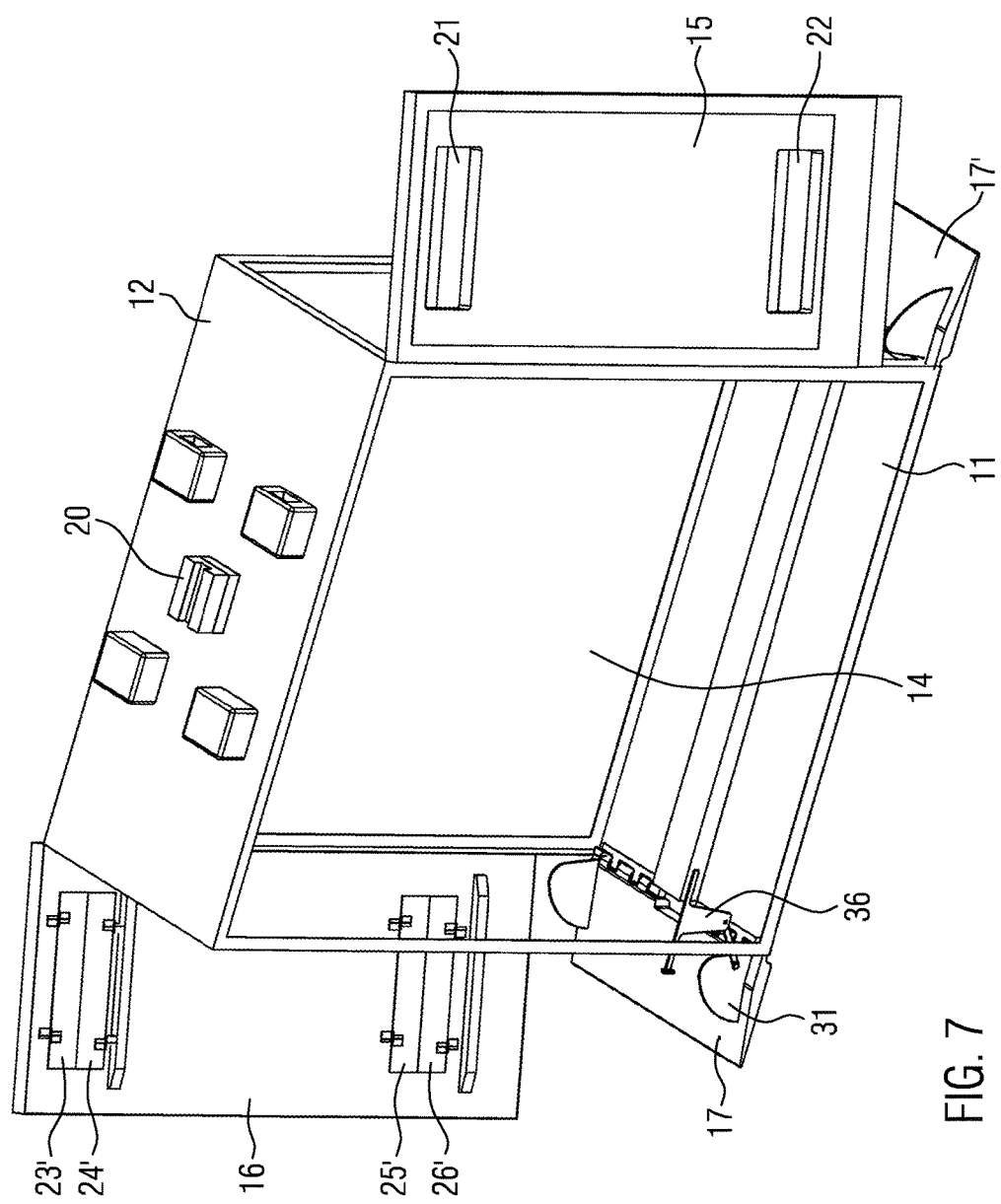
FIG. 7 shows a perspective view of the service box open at both ends.
Figure 9:
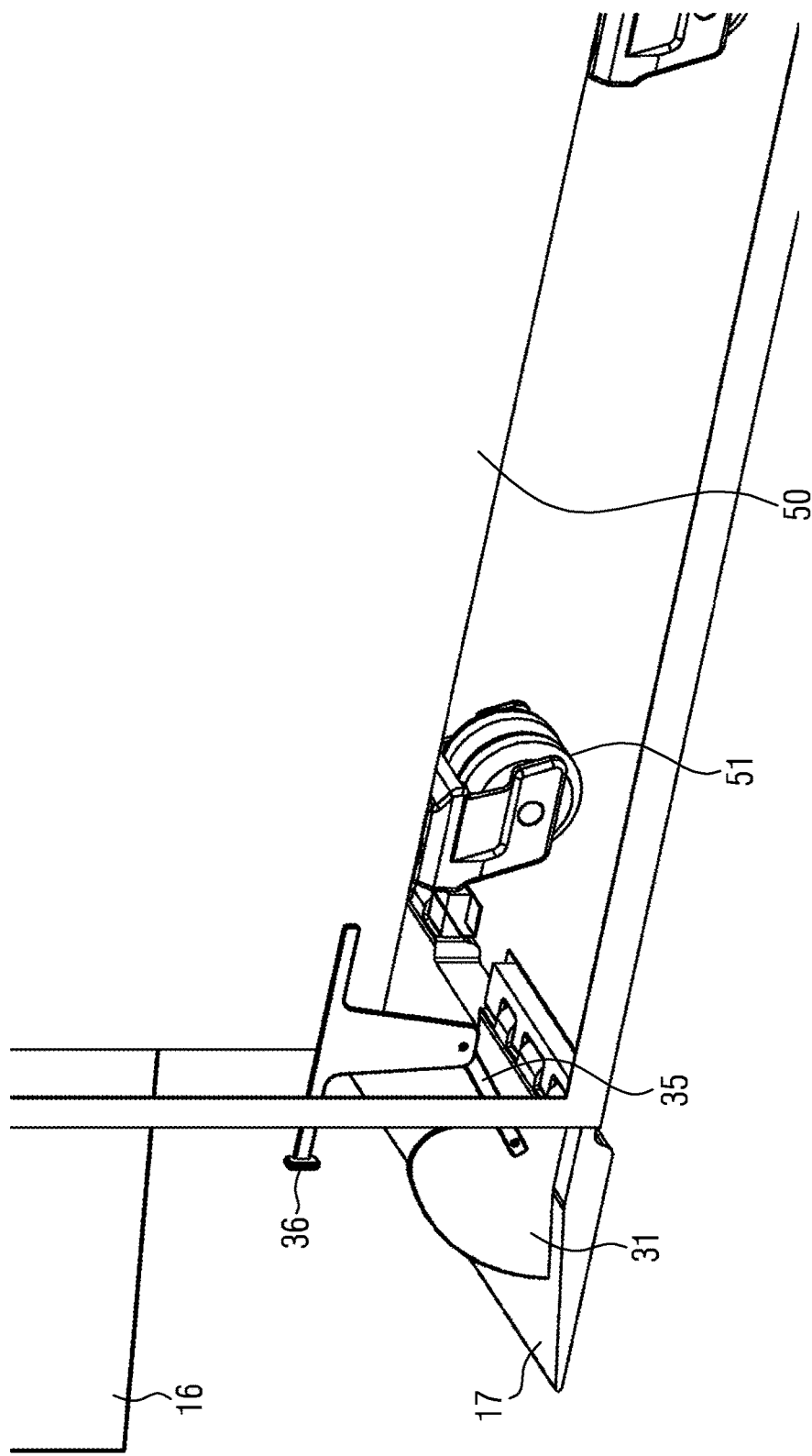
FIG. 9 shows in a view corresponding to FIG. 8 the ramp element in the bridging state.
Figure 10:
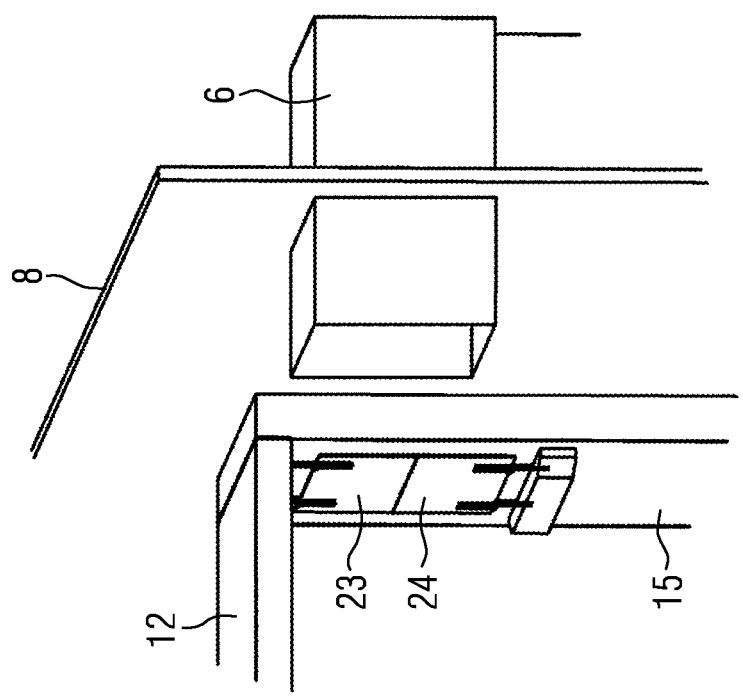
FIG. 10 shows in a partial view an upper rear portion of the service box of FIGS. 1 to 9 adjacent to a duct for guiding cooling air into the service box.

The service box 10 shown in FIGS. 2 to 6 comprises a rectangular bottom wall 11 and a correspondingly shaped upper wall 12 as well as two side walls 13, 14 and a narrow rear wall 15 (FIGS. 9 and 10). At both ends a door 15, 16 is provided which doors are pivotable about a vertical axis between a closed position (16 in FIGS. 2 and 3; 15 in FIGS. 2 to 6) and an open position (16 in FIGS. 4, 5 and 7; 15 in FIG. 7). In the rear door 15 an upper opening 21 and a lower opening 22 are provided. Corresponding openings 21' and 22' are provided in the door 16. At the inner side these openings are normally closed by flap arrangements 23, 24 (FIGS. 10 and 11) and 23', 24' and 25', 26'. Each flap arrangement comprises two flap elements mounted by spring elastic straps (shown but not designated) so that the flap arrangements can be moved from a closed position shown in FIGS. 4, 5, 7 and 10 to an open position shown in FIG. 11.

Figure 1:
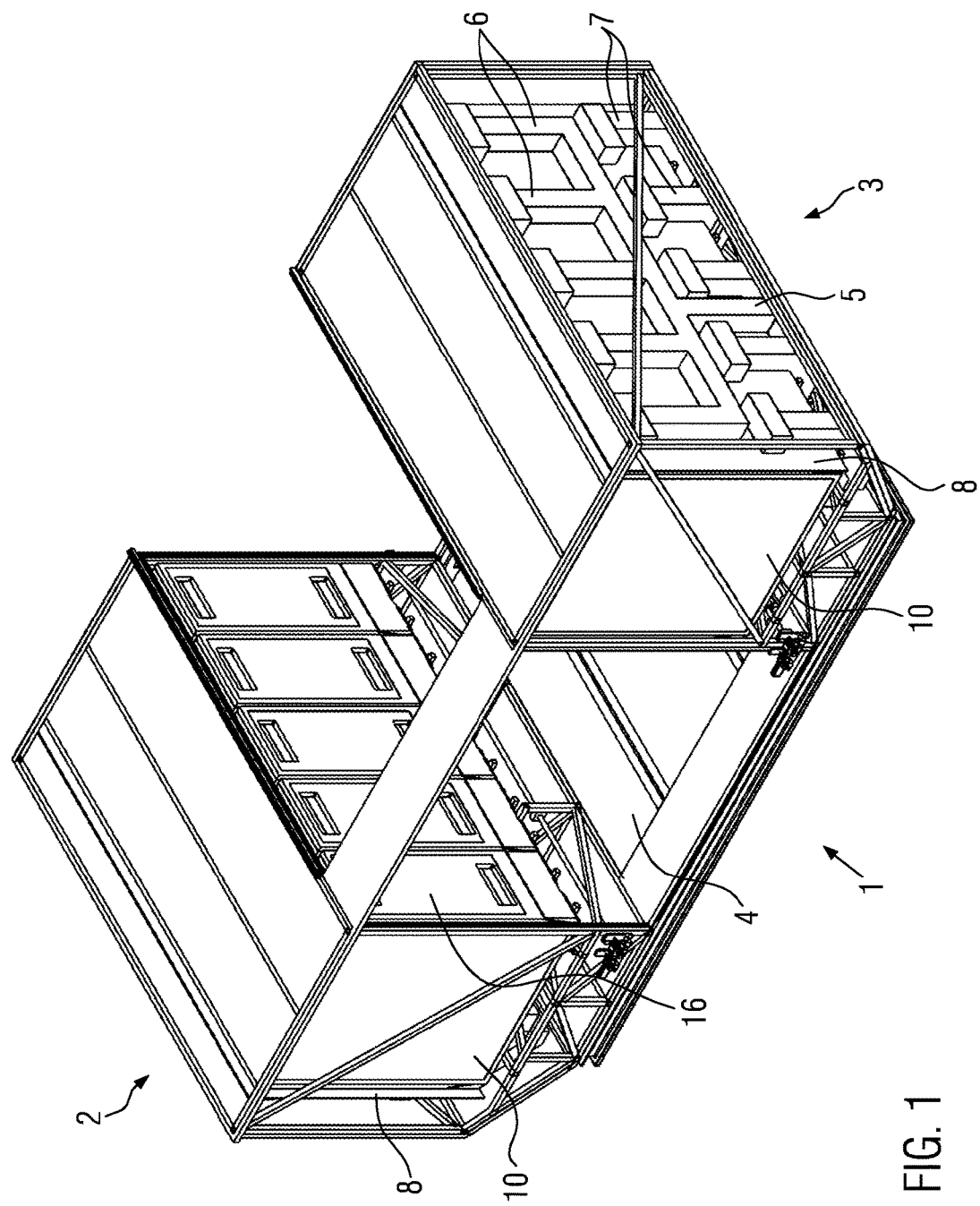
FIG. 1 shows a perspective view of a container comprising two storage rack arrangements filled with service boxes.
Figure 2:
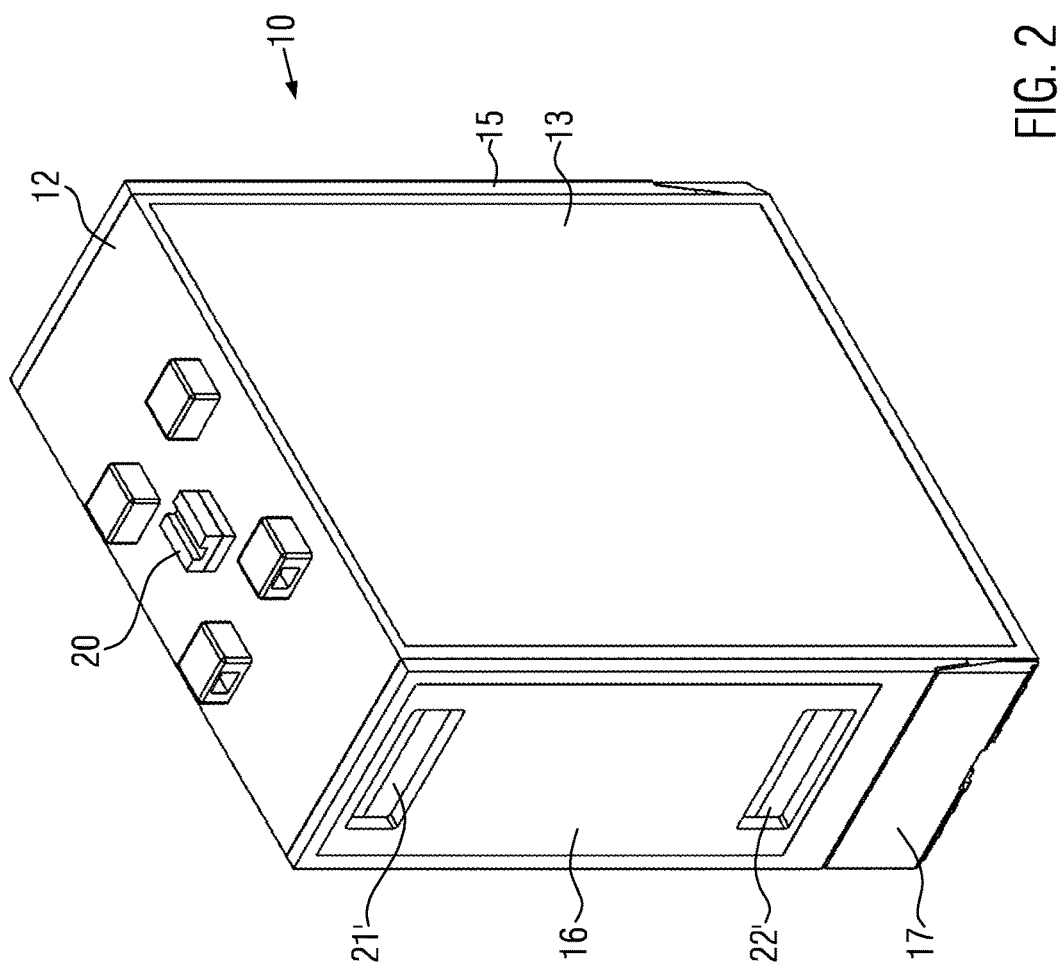
FIGS. 2 and 3 show different perspective views of a closed service box.
Figure 3:
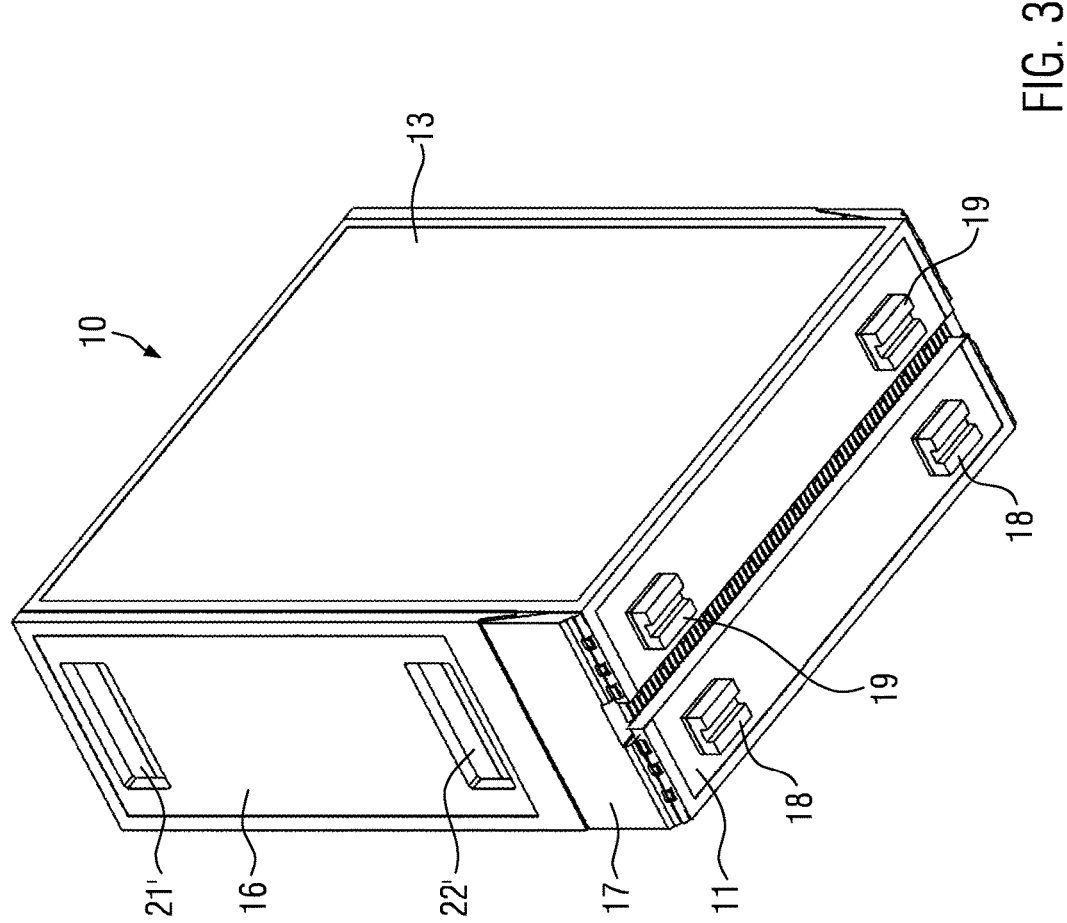
Figure 4:
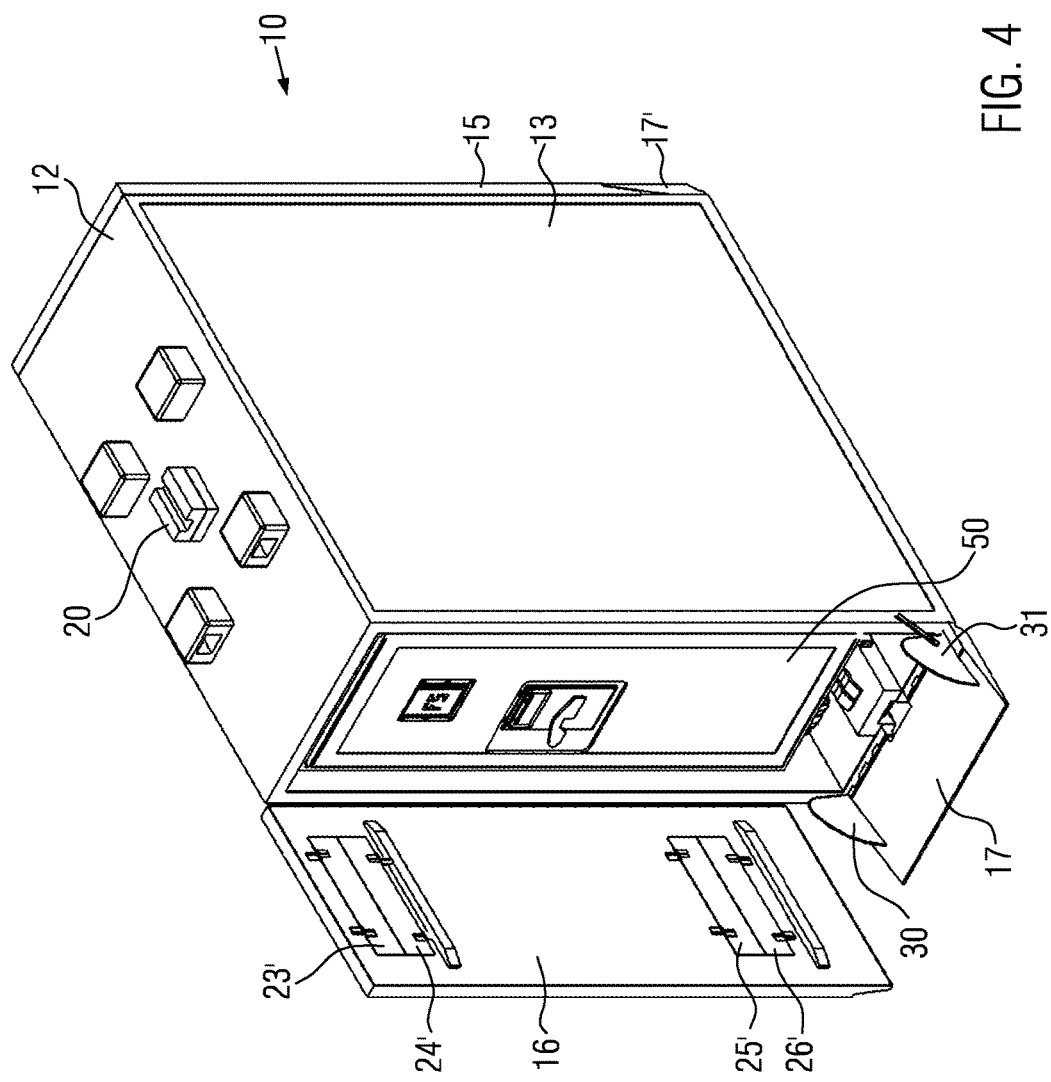
FIG. 4 shows the service box of FIGS. 2 and 3 with an open door and a trolley for catering goods within the service box.
Figure 5:
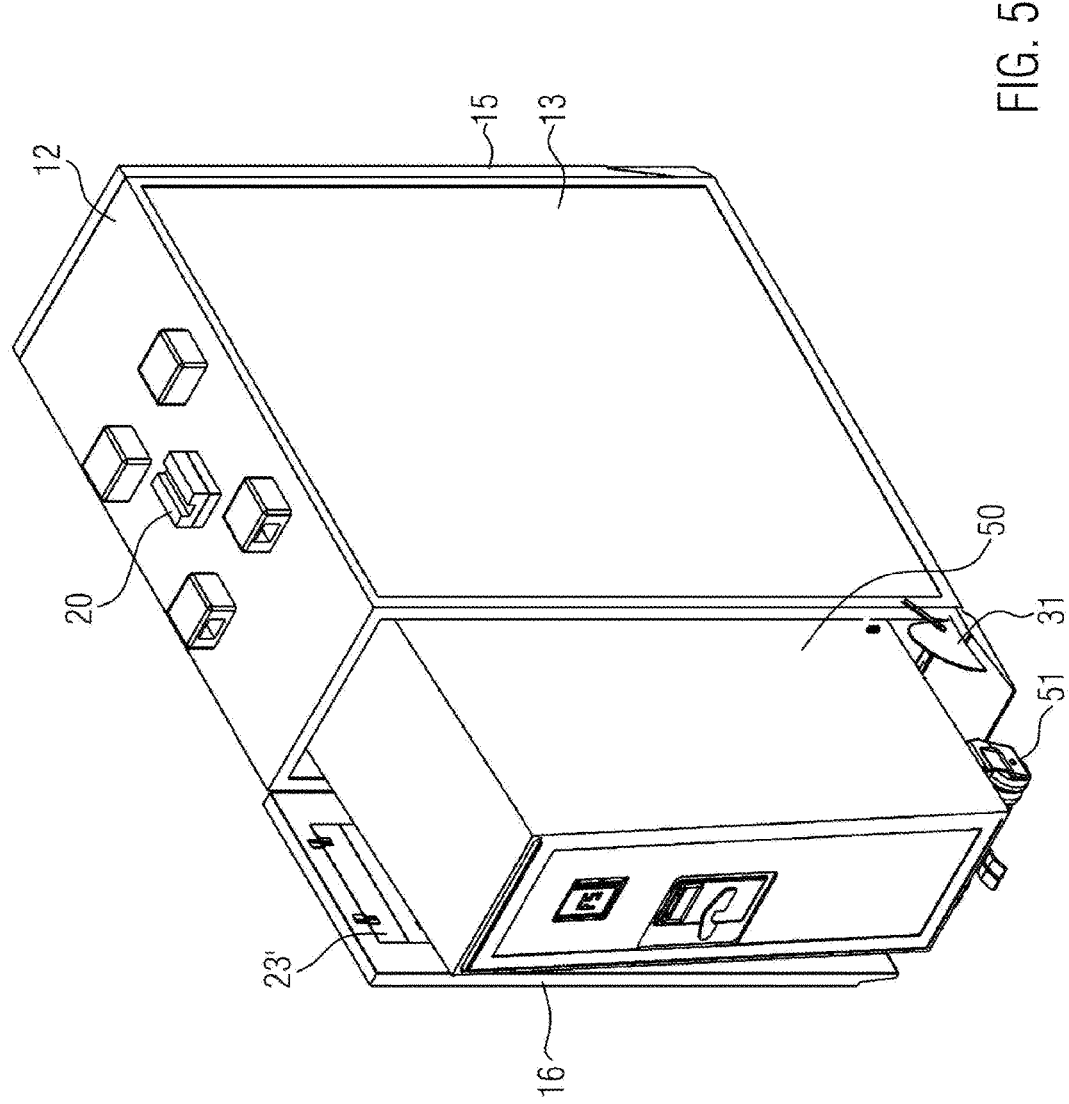
FIG. 5 shows the open service box of FIG. 4 with the trolley partially removed.
Figure 6:
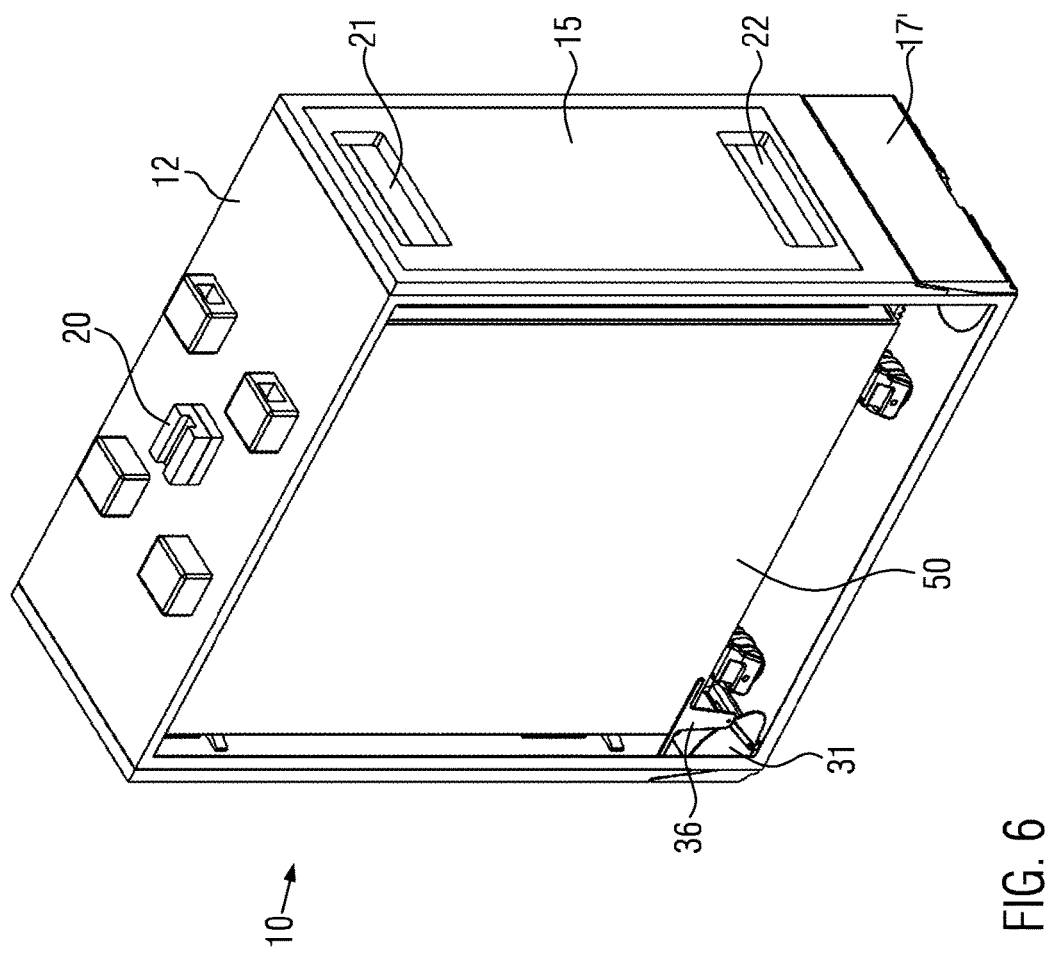
FIG. 6 shows a perspective view of the closed service box according to FIGS. 2 and 3 with a lateral wall removed.
Figure 11:
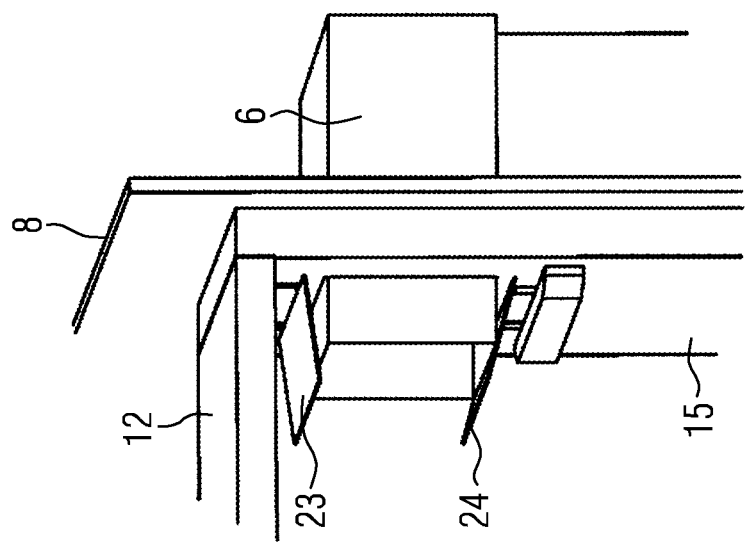
FIG. 11 shows in a view corresponding to FIG. 10 the duct inserted into the corresponding opening of the service box.

When the service box 10 contains a conventional trolley 50 with rollers 51, 52 as used for storing and transporting catering goods in an aircraft and is stored in a storage rack arrangement 2, 3 of a cargo container as shown in FIG. 1, the openings 21, 22 and 21', 22' may be used to cool the interior of the service box 10 and thereby the catering goods held in the trolley 50. For this purpose at the outer sides of the storage rack arrangements 2, 3 a duct arrangement is provided mounted on a wall 8. It comprises ducts 6 to be connected to a source for cooling air through a main duct 5. In particular, the main duct 5 may be connected to a common supply connector (not shown) on the rack arrangement 10 or on the entire container 1. Further, the duct arrangement comprises lower duct elements 7 which are used to remove used cooling air from the interior of the service boxes 10. The lower duct elements 7 can be connected to a common discharge connector on the rack arrangement 10 or the container 1. As indicated in FIGS. 10 and 11, the upper end of a duct 6 is moved into the upper opening 21 of the rear wall 15 when the service box 10 is inserted into the storage rack arrangement 2, 3, and thereby the flap elements 23, 24 are pivoted to an open position (FIG. 11). Simultaneously, the corresponding lower duct 7 is inserted into the lower opening 22, and the corresponding flap arrangement is pivoted to an open state (this insertion of duct 7 is not shown in the drawings). In this position of the service box 10 cooling air may be fed into its interior through duct 6, and used cooling air will be removed through duct 7. In this connection it should be noted that the cooling described will normally be effected only when the cargo container is positioned in the cargo compartment of the aircraft.

As described above, the service box 10 has upper openings 21, 21' and lower openings 22, 22' including flap arrangements in both doors 15, 16. These upper openings 21, 21' are located at the same height in door 15 and in door 16. The same applies for the lower openings 22, 22'. Thus, connection with a duct 6 and a duct 7 of the rack arrangement 10 and the cargo container 1, respectively, can be obtained by engagement with the openings in one of the doors 15, 16. This permits positioning of the service boxes 10 in the storage rack arrangements 2, 3 of FIG. 1 so that a door of all service boxes in one rack arrangement face the service boxes 10 in the other storage rack arrangement. Thereby removal of all service boxes 10 from the storage rack arrangements 2, 3 and positioning in the middle portion 4 results in the same orientation for all service boxes 10. Thus, when moving service boxes 10 to the passenger compartment, they will arrive there each with a door facing the same side.

To facilitate positioning of the service boxes 10 in the storage rack arrangement 2, 3, pairs of guide blocks 18, 19 are mounted on the bottom wall 11 of the service box 10. Each guide block comprises a guide groove (FIG. 3) with the guide grooves of each pair in alignment and the pairs located laterally offset from the middle plane which extends perpendicularly with respect to the closed front door. In addition, a guide block 20 is mounted on the upper wall 12 and also comprises a corresponding guide groove. When inserting the service box 10 into the rack arrangement 2, 3, guide bars of the rack arrangement engage with grooves of the guide blocks 18, 19, 20 and ensure correct positioning of the service box 10.

Figure 8:
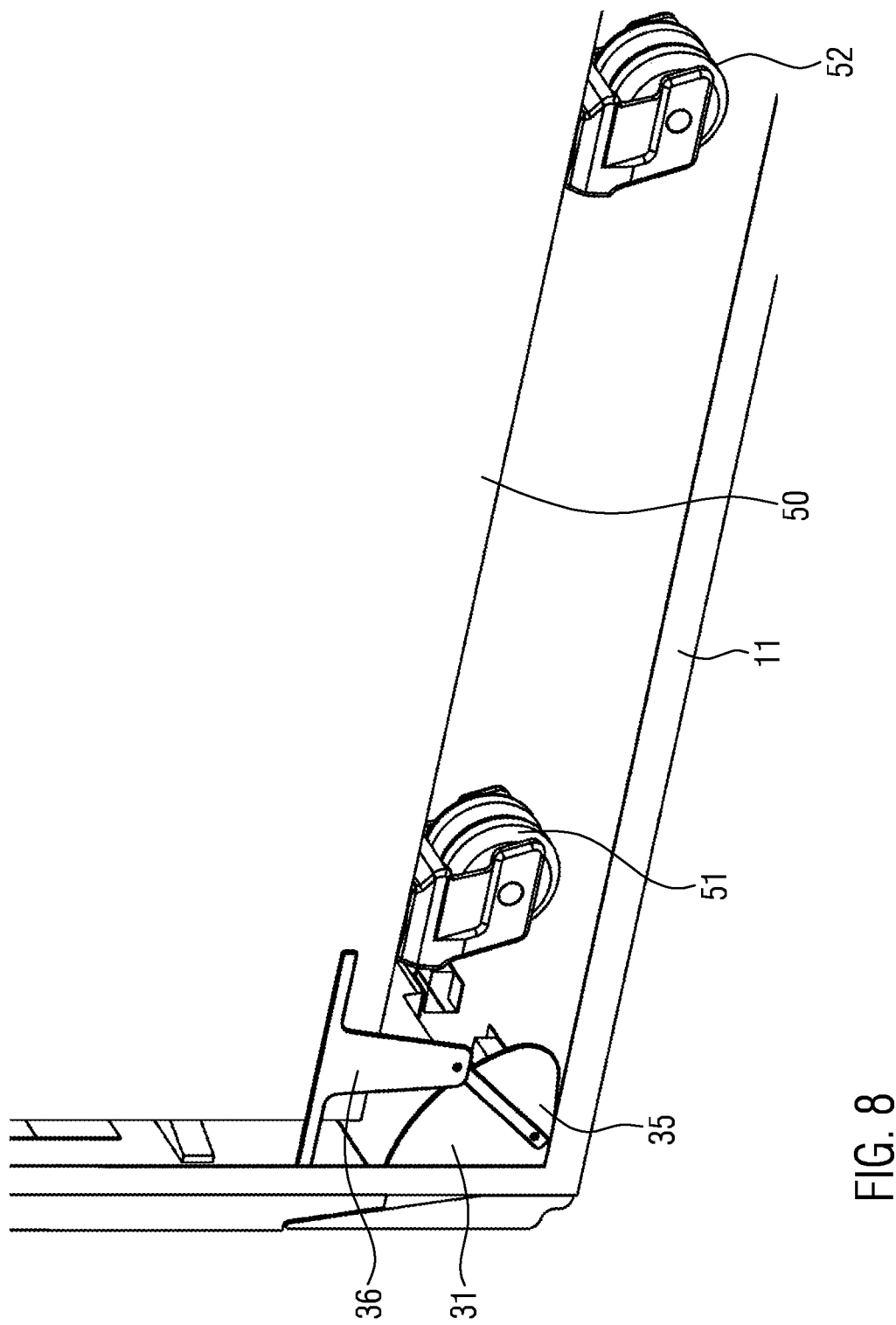
FIG. 8 shows a partial view of FIG. 6 to illustrate the linkage for pivoting the ramp element.

As shown in FIGS. 2 to 5 and 6 (side wall 13 removed), a ramp element 17, 17' is pivotably attached to each front end of the bottom wall 11 and, in the closed state (FIGS. 2 and 3), extends upwardly to the bottom edge of the door 16 thus, forming a narrow wall of the service box together with the door 16, 15. Lateral side covers 30, 31 are mounted at the lateral rims of the ramp element 17 at its end connected with the bottom wall 11. A linkage (FIGS. 8 and 9) comprises an arm 35 pivotably connected to the side cover 31 and coupled with an actuator element 36 (mounting of the actuator element in the service box 10 is not shown). When the door 16 is closed, it has pushed the actuator element 36 inwardly so that the arm 35 pivots the ramp element 17 to its closed position shown in FIGS. 2, 3 and 8 (side wall 13 removed in FIG. 8). Upon opening of the door 16 the ramp element 17 is spring biased to its bridging position (FIGS. 4, 5, 7 and 9) (side wall 13 removed in FIGS. 7 and 9) and pulls the actuator element 36 to a position in which it projects beyond the front end of the service box 10, as indicated in FIG. 9. Thus, upon closing of the door 16 the actuator element 36 will be displaced again and causes lifting of the ramp element 17. A corresponding linkage is provided for ramp element 17' at the other end of the service box.

In the bridging state (FIGS. 4, 5, 7 and 9) the ramp element 17 bridges the gap between the front end of the bottom wall 11 and the floor of the passenger cabin so that removal and reinsertion of the trolley 50 is facilitated. The side flaps 30, 31 prevent accidental insertion of debris from the floor of the passenger cabin.

Figure 12:
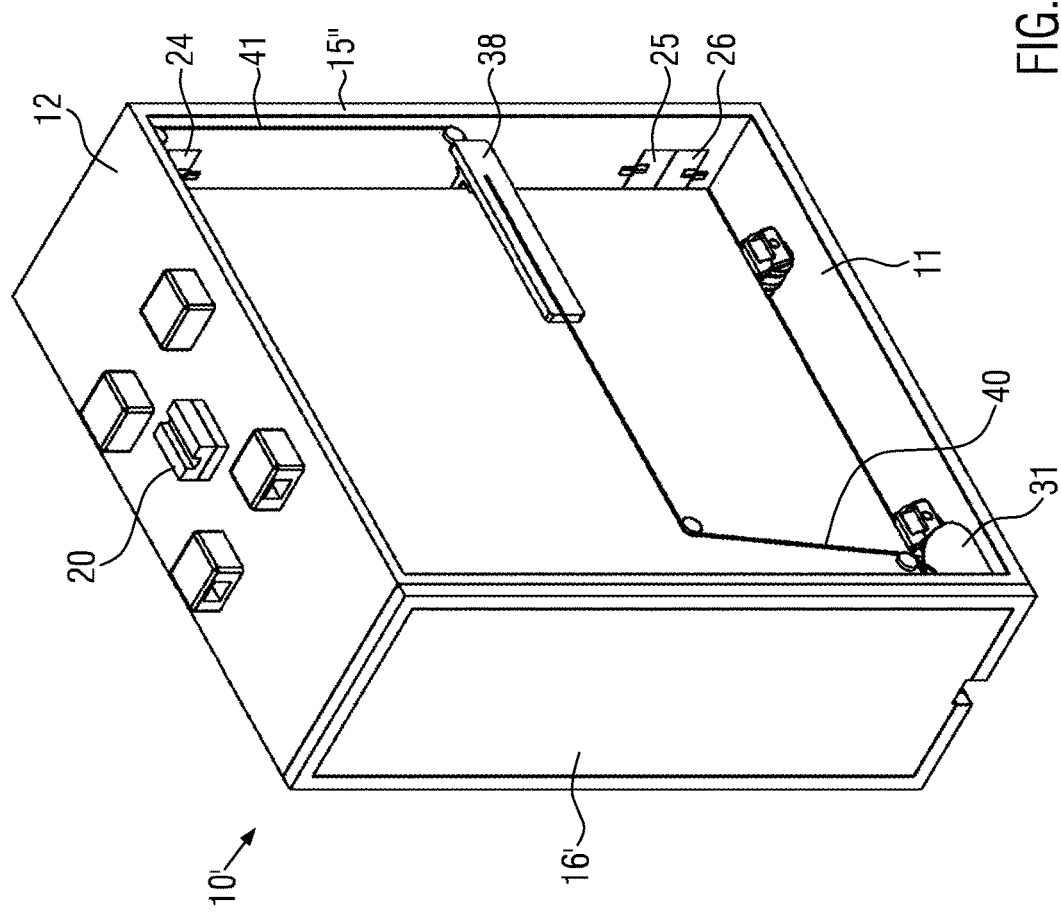
FIGS. 12 and 13 show in a perspective view another embodiment.
Figure 13:
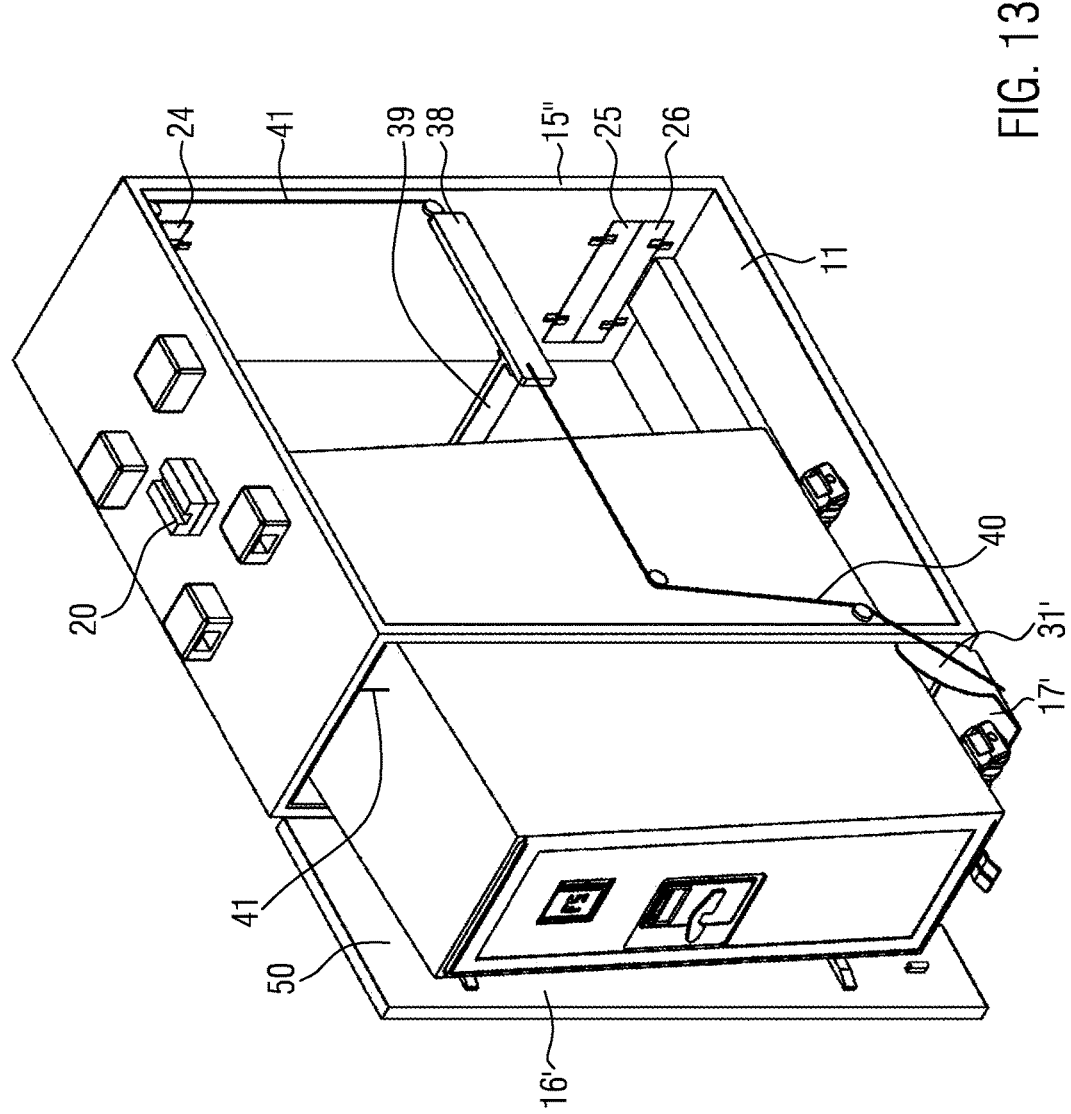

In FIGS. 12 and 13 a somewhat modified service box 10 is shown wherein the same elements as in FIGS. 2 to 10 are designated with the same reference numerals and will not be described again, whereas modified elements are designated with the same reference numerals and with '.

On the one hand, the service box 10 of FIGS. 12 and 13 differs from the service box 10 of FIGS. 2 to 11 in that the door 16' does not comprise an upper and a lower opening for inserting and removing cooling air and, on the other hand, that the other narrow end is closed by a fixed wall 15" in which the openings for inserting and removing cooling air are provided. In addition the mechanism for lifting the ramp element 17 from its bridging position (FIG. 13) differs from the one of FIGS. 2 to 9.

As shown schematically, a wire 40 is connected to the ramp element 17 or to the side cover 31 and is guided via rollers (not described in detail) and connected with its other end to a push bar 39. This push bar is displaceably guided within grooves (not shown) of guide elements 38 attached to the not shown side walls including the wall corresponding to the wall 13 in FIGS. 2 to 5. (Wire arrangements may be connected to both end portions of the push bar.) The inserted trolley 50 displaces the push bar 39 to the rear end of the not shown slot in the guide elements 38 (FIG. 12) and thereby effects pivoting of the ramp element 17 to an upward position so that the door 16' can be closed.

When opening the door 16' and removing the trolley 50, the push bar 39 slides forwardly in the slots of the guide elements 38 due to the spring force acting on the ramp element 17 so that the ramp element 17 can move to its bridging position (FIG. 13).

To facilitate lifting of the ramp element 17 and closing of the door when no trolley is inserted another wire arrangement 41 is provided which is connected to the push bar 39 and guided via rollers not designated to the door opening where the user can manually pull back the push bar and thereby lift the ramp element.

To pivot the ramp element 17 to its upward position when no trolley is inserted, a manually actuable linkage may be provided which, however, is not shown in the drawings. In particular, the mechanism employed in the service box shown in FIGS. 2 to 10 may additionally be used.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A service box for storing in a storage rack arrangement of a cargo container of a vehicle, in particular an aircraft, comprising:
   a rectangular bottom wall, a rectangular upper wall, two side walls and two end walls;
   an interior space adapted to receive a trolley for catering goods wherein at least one of the end walls comprises a door, which door forms at least a main part of the at least one end wall and in an open state permits insertion and removal of the trolley and in a closed state provides an essentially closed space for the trolley;
   a ramp element pivotably attached to the rectangular bottom wall to bridge a gap between the service box and a floor of the aircraft, wherein the ramp element is spring biased to a bridging position, and
   a push bar in the interior space which is coupled with the ramp element and which effects lifting of the ramp element upon displacement due to engagement with the inserted trolley.

2. The service box according to claim 1, wherein both end walls comprise a door.

3. The service box according to claim 1, wherein, in at least one of the end walls, an opening is provided for insertion of a duct for guiding a cooling medium into the interior space.

4. The service box according to claim 3, wherein the opening is provided in an upper portion of the at least one end wall, and wherein an exit opening is provided in a lower portion of the at least one end wall.

5. The service box according to claim 3, wherein the opening and an exit opening are closed by a pivotable flap arrangement.

6. The service box according to claim 5, wherein the pivotable flap arrangement comprises two flap elements, each flap element mounted by spring elastic straps which bias the flap element in a closed position.

7. The service box according to claim 1, wherein, in a lifted state, the ramp element together with the door forms the at least one end wall.

8. The service box according to claim 1, wherein a linkage coupled with the ramp element comprises an actuator, which in the bridging position of the ramp element projects forwardly beyond a front end of the service box and upon closing of the door is displaced by the door so that the ramp element is lifted.

9. The service box according to claim 1, wherein coupling between the ramp element and the push bar is effected by a wire arrangement.

10. The service box according to claim 1, comprising lateral side covers provided on lateral rims of the ramp element at an end connected with the rectangular bottom wall of the service box.

11. The service box according to claim 1, comprising a guide for guiding the service box into position in the storage rack arrangement.

12. The service box according to claim 11, wherein the guide is formed by guide blocks which comprise a groove for engagement with a guide rail provided in the storage rack arrangement.

13. The service box according to claim 12, wherein two groups of guide blocks are located on the rectangular bottom wall laterally offset from a middle plane which extends perpendicularly with respect to the closed front door, and wherein at least one guide block is provided on the rectangular upper wall and located in the middle plane.

\* \* \* \* \*